(12) United States Patent
Iida

(10) Patent No.: US 8,151,552 B2
(45) Date of Patent: Apr. 10, 2012

(54) DETERIORATION DETERMINATION DEVICE AND METHOD FOR EXHAUST EMISSION REDUCTION DEVICE, AND ENGINE CONTROL UNIT

(75) Inventor: Jun Iida, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 487 days.

(21) Appl. No.: 12/483,355

(22) Filed: Jun. 12, 2009

(65) Prior Publication Data

US 2009/0313970 A1 Dec. 24, 2009

(30) Foreign Application Priority Data

Jun. 20, 2008 (JP) ................................. 2008-161493

(51) Int. Cl.
*F01N 3/00* (2006.01)
(52) U.S. Cl. ................ 60/277; 60/274; 60/286; 60/295; 60/301
(58) Field of Classification Search ............ 60/274, 60/277, 284–286, 295–301
See application file for complete search history.

(56) References Cited

U.S. PATENT DOCUMENTS

| | | | |
|---|---|---|---|
| 6,003,309 A | 12/1999 | Agustin et al. | |
| 6,145,304 A * | 11/2000 | Takahashi et al. | 60/277 |
| 6,256,983 B1 * | 7/2001 | Yasui | 60/285 |
| 6,474,147 B2 * | 11/2002 | Takaoka et al. | 73/114.75 |
| 6,539,707 B2 * | 4/2003 | Ikemoto et al. | 60/285 |
| 6,600,998 B1 * | 7/2003 | Majima et al. | 702/24 |
| 6,622,478 B2 * | 9/2003 | Nakamura | 60/285 |
| 6,698,187 B2 * | 3/2004 | Nishioka et al. | 60/277 |
| 6,850,165 B2 * | 2/2005 | Sakanushi et al. | 340/633 |
| 7,159,385 B2 * | 1/2007 | Uchida | 60/277 |
| 7,165,389 B2 * | 1/2007 | Kamoto et al. | 60/274 |
| 2004/0163381 A1 | 8/2004 | Shirakawa et al. | |

FOREIGN PATENT DOCUMENTS

| | | |
|---|---|---|
| EP | 1054141 A1 | 11/2000 |
| JP | 2000-328929 A | 11/2000 |

* cited by examiner

*Primary Examiner* — Thomas Denion
*Assistant Examiner* — Jesse Bogue
(74) *Attorney, Agent, or Firm* — Arent Fox LLP

(57) ABSTRACT

A deterioration determining device for an exhaust emission reduction device which is capable of improving the accuracy of determination of deterioration of a catalyst as a target, when another catalyst is disposed upstream of the target. The deterioration determining device for determining deterioration of a downstream one of two catalysts includes an ECU. After switching the air-fuel ratio from a learn value to a rich value, the ECU calculates an upstream oxygen storage capability using respective equivalent ratios detected by two LAF sensors, calculates a correction coefficient according to the value of the capability, calculates a basic value of a downstream oxygen storage capability using equivalent ratios detected by two LAF sensors, and multiples the basic value by the correction coefficient to calculate the downstream oxygen storage capability. When this is smaller than a predetermined value, the downstream catalyst is determined to be deteriorated.

9 Claims, 9 Drawing Sheets

DETERIORATION DETERMINATION DEVICE AND METHOD FOR EXHAUST EMISSION REDUCTION DEVICE, AND ENGINE CONTROL UNIT

BACKGROUND OF THE INVENTION

1. Field of the Invention

The present invention relates to a deterioration determining device and method for an exhaust emission reduction device including two catalysts serially disposed in an exhaust passage of an internal combustion engine, for purifying exhaust gases, the deterioration determining device and method being configured to determine deterioration of a downstream one of the catalysts, and an engine control unit.

2. Description of the Related Art

Conventionally, the present assignee has already proposed a deterioration determination device for an exhaust emission reduction device in Japanese Laid-Open Patent Publication (Kokai) No. 2000-328929. This exhaust emission reduction device is comprised of a three-way catalyst disposed in an exhaust passage of an internal combustion engine at a predetermined location thereof, for purifying unburned fuel in exhaust gases, and a NOx purifying catalyst disposed downstream of the three-way catalyst, for purifying NOx in the exhaust gases. Further, the deterioration determination device is for determining deterioration of the NOx purifying catalyst, and is comprised of a LAF sensor disposed in the exhaust passage at a location upstream of the three-way catalyst, and an upstream O2 sensor disposed in the exhaust passage at a location between the three-way catalyst and the NOx purifying catalyst, and a downstream O2 sensor disposed in the exhaust passage at a location downstream of the NOx purifying catalyst. The three sensors are all for detecting states of the air-fuel ratio of exhaust gases.

In this deterioration determination device, as shown in FIGS. 4 and 5 of the Japanese Laid-Open Patent Publication (Kokai) No. 2000-328929, deterioration determination on the NOx purifying device is carried out based on an output value VLAF from the LAF sensor, an output value SVO2 from the upstream O2 sensor, and an output value TVO2 from the downstream O2 sensor. That is, on condition that the answer to the question of a step 43 is affirmative (YES) which means that the engine is in rich operation, a time period from a time point at which the condition of VLAF>VLAFREF is satisfied to a time point at which the condition of SVO2>SVO2REF is satisfied is counted as a first timer count value tmMON1 (steps 46 to 51). Further, a time period after the time point at which the condition of SVO2>SVO2REF is satisfied to a time point at which the condition of TVO2>TVO2REF is satisfied is counted as a second timer count value tmMON2 (steps 52 to 55). Then, according to the first timer count value tmMON2, a correction coefficient KMNO2 is calculated (step 66). Then, a value obtained by multiplying the second timer count value tmMON2 by the correction coefficient KMNO2 is set as a corrected count value tmMON2C (step 67), and when the corrected count value tmMON2C is smaller than a reference value TNOXREF, it is determined that the NOx purifying catalyst is deteriorated. In the other cases, it is determined that the NOx purifying catalyst is normal (steps 68 to 70).

As described above, according to this deterioration determination device, the deterioration determination on the NOx purifying catalyst is executed based on a result of comparison between the value obtained by correcting the second timer count value tmMON2 according to the first timer count value tmMON1 and the reference value TNOXREF. This method is employed because the first timer count value tmMON2 is calculated as a value representing the difference in timing in which the air-fuel ratio of exhaust gases on the upstream side of the three-way catalyst changes such that it becomes richer than the stoichiometric air-fuel ratio, and timing in which the air-fuel ratio of exhaust gases on the downstream side of the three-way catalyst changes such that it becomes richer than the stoichiometric air-fuel ratio, and hence it represents a degree of deterioration of the three-way catalyst.

According to the deterioration determination device proposed in Japanese Laid-Open Patent Publication (Kokai) No. 2000-328929, the output values from the three sensors for detecting states of the air-fuel ratio of exhaust gases are directly used for determination of deterioration of the NOx purifying catalyst, and hence there is a possibility of lowering of the determination accuracy as described hereafter. For example, if the air-fuel ratio and/or exhaust gas flow rate changes due to a change in operating conditions of the engine, the reactivity of each of the two catalysts varies, which sometimes causes lowering of the accuracy of the determination. More specifically, since the first timer count value tmMON1 is calculated based on the output value VLAF from the LAF sensor and the output value SVO2 from the upstream O2 sensor, if the reactivity of three-way catalyst changes, this causes lowering of the accuracy of calculation of the first timer count value tmMON1, i.e. that of calculation of the correction coefficient KMNO2. Similarly, since the second timer count value tmMON2 is calculated based on the output value SVO2 from the upstream O2 sensor and the output value TVO2 from the downstream O2 sensor, if the reactivity of the NOx purifying catalyst changes, this causes lowering of the accuracy of calculation of the second timer count value tmMON2. As described above, if the accuracy of calculation of the correction coefficient KMNO2 and that of calculation of the second timer count value tmMON2 are lowered, the accuracy of the deterioration determination is also lowered accordingly.

Further, since the upstream O2 sensor and the downstream O2 sensor are disposed respectively between the three-way catalyst and the NOx purifying catalyst and on the downstream side of the NOx purifying catalyst, if the air-fuel ratio of exhaust gases is changed from the leaner side into the richer side, the timing in which the condition of SVO2>SVO2REF is satisfied and the timing in which the condition of TVO2>TVO2REF is satisfied change depending on the activities and sulfur-poisoned states of the three-way catalyst and the NOx purifying catalyst. This results in the lowering of the accuracy of calculation of the above two timer count values tmMON1 and tmMON2, and accordingly lowers the accuracy of the deterioration determination.

SUMMARY OF THE INVENTION

It is an object of the present invention to provide a deterioration determining device and method for an exhaust emission reduction device and an engine control unit, which are capable of improving the accuracy of determination of deterioration of a catalyst as a target for deterioration determination, when another catalyst is disposed upstream of the catalyst as the target.

To attain the above object, in a first aspect of the present invention, there is provided a deterioration determination device for an exhaust emission reduction device including an upstream catalyst that purifies exhaust gases flowing through an exhaust passage of an internal combustion engine and has an oxygen storage capability, and a downstream catalyst that purifies exhaust gases in the exhaust passage downstream of the upstream catalyst and has an oxygen storage capability, the deterioration determination device determining deterioration of the downstream catalyst, comprising upstream oxygen concentration parameter-detecting means for detecting an oxygen concentration parameter indicative of an oxygen concentration in exhaust gases upstream of the upstream catalyst, as an upstream oxygen concentration parameter, intermediate oxygen concentration parameter-detecting means for detecting an oxygen concentration parameter indicative of an oxygen concentration in exhaust gases between the upstream catalyst and the downstream catalyst, as an intermediate oxygen concentration parameter, downstream oxygen concentration parameter-detecting means for detecting an oxygen concentration parameter indicative of an oxygen concentration in exhaust gases downstream of the downstream catalyst, as a downstream oxygen concentration parameter, control means for controlling exhaust gases flowing into the upstream catalyst by switching between an oxidation atmosphere and a reduction atmosphere, upstream OSC parameter-calculating means for calculating an upstream OSC parameter indicative of the oxygen storage capability of the upstream catalyst, using the upstream oxygen concentration parameter and the intermediate oxygen concentration parameter which are detected on the exhaust gases after the exhaust gases are switched by the control means from the oxidation atmosphere to the reduction atmosphere, downstream OSC parameter-calculating means for calculating a downstream OSC parameter indicative of the oxygen storage capability of the downstream catalyst, using the intermediate oxygen concentration parameter and the downstream oxygen concentration parameter which are detected on the exhaust gases after the exhaust gases are switched by the control means from the oxidation atmosphere to the reduction atmosphere, corrected downstream OSC parameter-calculating means for calculating a corrected downstream OSC parameter by correcting the calculated downstream OSC parameter according to the calculated upstream OSC parameter; and deterioration determination means for executing deterioration determination of the downstream catalyst, using the calculated corrected downstream OSC parameter.

With the configuration of the deterioration determination device for the exhaust emission reduction device, according to the first aspect of the present invention, the upstream OSC parameter indicative of the oxygen storage capability of the upstream catalyst is calculated using the upstream oxygen concentration parameter and the intermediate oxygen concentration parameter which are detected on the exhaust gases after the exhaust gases are switched by the control means from the oxidation atmosphere to the reduction atmosphere, and the downstream OSC parameter indicative of the oxygen storage capability of the downstream catalyst is calculated using the intermediate oxygen concentration parameter and the downstream oxygen concentration parameter which are detected on the exhaust gases after the exhaust gases are switched by the control means from the oxidation atmosphere to the reduction atmosphere. The corrected downstream OSC parameter is calculated by correcting the calculated downstream OSC parameter according to the calculated upstream OSC parameter, and deterioration determination of the downstream catalyst is executed using the calculated corrected downstream OSC parameter.

In the case of a catalyst having an oxygen storage capability, it is known that the oxygen storage capability thereof accurately represents a degree of deterioration of the catalyst. Further, in calculating the oxygen storage capability parameter using integral values obtained by integrating the values representative of the amounts of reducing agents in the exhaust gases upstream and downstream of the catalyst, it is general practice to calculate values representative of amounts of reducing agents on the upstream side and the downstream side of the catalyst based on the two oxygen concentration parameters, respectively, and calculate the oxygen storage capability parameter using integral values thereof obtained by integrating the values representative of amounts of reducing agents. Therefore, according to the deterioration determination device, even when the reactivities of the upstream and downstream catalysts temporarily change due to changes in the air-fuel ratio of the exhaust gases, by using the integral values calculated from the results of detection of the parameters, the upstream OSC parameter and the downstream OSC parameter can be calculated such that they accurately represent the degrees of deterioration of the upstream and downstream catalysts, respectively, while preventing the calculation from being adversely affected by the temporary changes in the reactivities of the two catalysts. Further, the corrected downstream OSC parameter is calculated by correcting the downstream OSC parameter according to the upstream OSC parameter, and hence the corrected downstream OSC parameter can be calculated such that it accurately represents the degree of deterioration of the downstream catalyst while eliminating the influence of the deterioration of the upstream catalyst. As a consequence, compared with the method disclosed in Japanese Laid-Open Patent Publication (Kokai) No. 2000-328929, which performs catalyst deterioration by directly using the output values from the three sensors that detect states of the air-fuel ratio of exhaust gases, it is possible to improve the accuracy of the determination.

Further, when the exhaust gases are changed from the oxidation atmosphere to the reduction atmosphere, the slope of a change in the detection result of the intermediate oxygen concentration parameter-detecting means resulting from the change in the exhaust gases can vary by being influenced by the activity and poisoned state of the upstream catalyst, and the slope of a change in the detection result of the downstream oxygen concentration parameter-detecting means can also vary by being influenced by the activity and poisoned state of the downstream catalyst. However, according to this deterioration determination device, the two oxygen concentration capability parameters are calculated using the integral values representative of the amounts of reducing agents calculated based on the detection results of the three oxygen concentration parameter-detecting means. This makes it possible to perform the deterioration determination while suppressing the influence of the changes in the slopes of the detection results of the two oxygen concentration parameter-detecting means which are caused by the influence of the activities and poisoned states of the two catalysts. Therefore, compared with the deterioration determination device disclosed in Japanese Laid-Open Patent Publication (Kokai) No. 2000-328929, it is possible to improve the accuracy of the determination. (It should be noted that "detecting" in "detecting the upstream oxygen concentration parameter", "detecting the intermediate oxygen concentration parameter", and "detecting the downstream oxygen concentration parameter" are not limited to directly detecting these value using sensors or the like, but includes calculating these values based on other parameters.

Preferably, the deterioration determination device further comprises an exhaust gas amount parameter-detecting means for detecting an exhaust gas amount parameter indicative of an amount of exhaust gases supplied to the upstream catalyst, and the upstream OSC parameter-calculating means calculates a first reducing agent amount parameter indicative of an amount of reducing agents supplied to the upstream catalyst and a second reducing agent amount parameter indicative of an amount of reducing agents flowing through the downstream catalyst, using the upstream oxygen concentration parameter, the intermediate oxygen concentration parameter, and the exhaust gas amount parameter, and calculates the upstream OSC parameter, using a first integrated value and a second integrated value obtained by integrating the first reducing agent amount parameter and the second reducing agent amount parameter, at a predetermined computation period, respectively, the downstream OSC parameter-calculating means calculating the second reducing agent amount parameter indicative of an amount of reducing agents supplied to the downstream catalyst and a third reducing agent amount parameter indicative of an amount of reducing agents flowing through the downstream catalyst, using the intermediate oxygen concentration parameter, the downstream oxygen concentration parameter, and the exhaust gas amount parameter, and calculating the downstream OSC parameter using the second integrated value and a third integrated value obtained by integrating the second reducing agent parameter and the third reducing agent parameter, at the predetermined computation period, respectively.

With the configuration of this preferred embodiment, the first reducing agent amount parameter indicative of the amount of reducing agents supplied to the upstream catalyst and the second reducing agent amount parameter indicative of the amount of reducing agents flowing through the downstream catalyst are calculated using the upstream oxygen concentration parameter, the intermediate oxygen concentration parameter, and the exhaust gas amount parameter, and the upstream OSC parameter is calculated using the first integrated value and the second integrated value obtained by integrating the first reducing agent amount parameter and the second reducing agent amount parameter, at the predetermined computation period. Therefore, even when temporary errors occur in the detection results of the upstream oxygen concentration parameter-detecting means and the intermediate oxygen concentration parameter-detecting means due to changes in the flow rate of exhaust gases, which are caused by changes in the operating conditions of the engine, it is possible to accurately calculate the upstream OSC parameter, while preventing the calculation from being adversely affected by the temporary errors. Further, the second reducing agent amount parameter indicative of the amount of reducing agents supplied to the downstream catalyst and the third reducing agent amount parameter indicative of the amount of reducing agents flowing through the downstream catalyst are calculated using the intermediate oxygen concentration parameter, the downstream oxygen concentration parameter, and the exhaust gas amount parameter, and the downstream OSC parameter is calculated using the second integrated value and the third integrated value obtained by integrating the second reducing agent parameter and the third reducing agent parameter, at the predetermined computation period. Therefore, even when temporary errors occur in the detection results of the intermediate stream oxygen concentration parameter-detecting means and the downstream oxygen concentration parameter-detecting means due to changes in the flow rate of exhaust gases, which are caused by changes in the operating conditions of the engine, it is possible to accurately calculate the downstream OSC parameter, while preventing the calculation from being adversely affected by the temporary errors. From the above, it is possible to further improve the accuracy of the deterioration determination.

Preferably, the corrected downstream OSC parameter-calculating means calculates the corrected downstream OSC parameter, such that as the oxygen storage capability of the upstream catalyst indicated by the upstream OSC parameter is smaller, the oxygen storage capability of the downstream catalyst indicated by the corrected downstream OSC parameter becomes larger.

In the case where the downstream OSC parameter indicative of the oxygen storage capability of the downstream catalyst is calculated using the intermediate oxygen concentration parameter and the downstream oxygen concentration parameter, as is the case with this deterioration determination device for the exhaust emission reduction device, as the upstream catalyst is more deteriorated, the oxygen storage capability of the upstream catalyst becomes smaller, and accordingly, the activity of the exhaust gases flowing into the downstream catalyst lowers. This brings about a possibility that even though the oxygen storage capability of the downstream catalyst is not lowered, the downstream OSC parameter can be calculated such that it indicates lowering of the oxygen storage capability of the downstream catalyst. However, according to this deterioration determination device, the corrected downstream OSC parameter is calculated such that as the oxygen storage capability of the upstream catalyst indicated by the upstream OSC parameter is smaller, the oxygen storage capability of the downstream catalyst indicated by the corrected downstream OSC parameter becomes larger. This makes it possible to calculate the corrected downstream OSC parameter while eliminating the influence of lowering of the oxygen storage capability of the upstream catalyst such that it accurately represents an actual oxygen storage capability of the downstream catalyst.

To attain the above object, in a second aspect of the present invention, there is provided a deterioration determination method for an exhaust emission reduction device including an upstream catalyst that purifies exhaust gases flowing through an exhaust passage of an internal combustion engine and has an oxygen storage capability, and a downstream catalyst that purifies exhaust gases in the exhaust passage downstream of the upstream catalyst and has an oxygen storage capability, the deterioration determination method determining deterioration of the downstream catalyst, comprising detecting an oxygen concentration parameter indicative of an oxygen concentration in exhaust gases upstream of the upstream catalyst, as an upstream oxygen concentration parameter, detecting an oxygen concentration parameter indicative of an oxygen concentration in exhaust gases between the upstream catalyst and the downstream catalyst, as an intermediate oxygen concentration parameter, detecting an oxygen concentration parameter indicative of an oxygen concentration in exhaust gases downstream of the downstream catalyst, as a downstream oxygen concentration parameter, controlling exhaust gases flowing into the upstream catalyst by switching between an oxidation atmosphere and a reduction atmosphere, calculating an upstream OSC parameter indicative of the oxygen storage capability of the upstream catalyst, using the upstream oxygen concentration parameter and the intermediate oxygen concentration parameter which are detected on the exhaust gases after the exhaust gases are switched by the controlling from the oxidation atmosphere to the reduction atmosphere, calculating a downstream OSC parameter indicative of the oxygen storage capability of the downstream catalyst, using the intermediate oxygen concentration parameter and the downstream oxygen concentration parameter which are detected on the exhaust gases after the exhaust gases are switched by the controlling from the oxidation atmosphere to the reduction atmosphere, calculating a corrected downstream OSC parameter by correcting the calculated downstream OSC parameter according to the calculated upstream OSC parameter, and executing deterioration determination of the downstream catalyst, using the calculated corrected downstream OSC parameter.

With the configuration of the deterioration determination method for an exhaust emission reduction device according to the second aspect of the present invention, it is possible to obtain the same advantageous effects as provided by the first aspect of the present invention.

Preferably, the deterioration determination method for an exhaust emission reduction device further comprises detecting an exhaust gas amount parameter indicative of an amount of exhaust gases supplied to the upstream catalyst, and the calculating the upstream OSC parameter includes calculating a first reducing agent amount parameter indicative of an amount of reducing agents supplied to the upstream catalyst and a second reducing agent amount parameter indicative of an amount of reducing agents flowing through the downstream catalyst, using the upstream oxygen concentration parameter, the intermediate oxygen concentration parameter, and the exhaust gas amount parameter, and calculating the upstream OSC parameter, using a first integrated value and a second integrated value obtained by integrating the first reducing agent amount parameter and the second reducing agent amount parameter, at a predetermined computation period, respectively, the calculating the downstream OSC parameter including calculating the second reducing agent amount parameter indicative of an amount of reducing agents supplied to the downstream catalyst and a third reducing agent amount parameter indicative of an amount of reducing agents flowing through the downstream catalyst, using the intermediate oxygen concentration parameter, the downstream oxygen concentration parameter, and the exhaust gas amount parameter, and calculating the downstream OSC parameter using the second integrated value and a third integrated value obtained by integrating the second reducing agent parameter and the third reducing agent parameter, at the predetermined computation period, respectively.

Preferably, the calculating the corrected downstream OSC parameter includes calculating the corrected downstream OSC parameter, such that as the oxygen storage capability of the upstream catalyst indicated by the upstream OSC parameter is smaller, the oxygen storage capability of the downstream catalyst indicated by the corrected downstream OSC parameter becomes larger.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a computer to execute a deterioration determination method for an exhaust emission reduction device including an upstream catalyst that purifies exhaust gases flowing through an exhaust passage of an internal combustion engine and has an oxygen storage capability, and a downstream catalyst that purifies exhaust gases in the exhaust passage downstream of the upstream catalyst and has an oxygen storage capability, the deterioration determination method determining deterioration of the downstream catalyst, wherein the deterioration determination method comprises detecting an oxygen concentration parameter indicative of an oxygen concentration in exhaust gases upstream of the upstream catalyst, as an upstream oxygen concentration parameter, detecting an oxygen concentration parameter indicative of an oxygen concentration in exhaust gases between the upstream catalyst and the downstream catalyst, as an intermediate oxygen concentration parameter, detecting an oxygen concentration parameter indicative of an oxygen concentration in exhaust gases downstream of the downstream catalyst, as a downstream oxygen concentration parameter, controlling exhaust gases flowing into the upstream catalyst by switching between an oxidation atmosphere and a reduction atmosphere, calculating an upstream OSC parameter indicative of the oxygen storage capability of the upstream catalyst, using the upstream oxygen concentration parameter and the intermediate oxygen concentration parameter which are detected on the exhaust gases after the exhaust gases are switched by the controlling from the oxidation atmosphere to the reduction atmosphere, calculating a downstream OSC parameter indicative of the oxygen storage capability of the downstream catalyst, using the intermediate oxygen concentration parameter and the downstream oxygen concentration parameter which are detected on the exhaust gases after the exhaust gases are switched by the controlling from the oxidation atmosphere to the reduction atmosphere, calculating a corrected downstream OSC parameter by correcting the calculated downstream OSC parameter according to the calculated upstream OSC parameter, and executing deterioration determination of the downstream catalyst, using the calculated corrected downstream OSC parameter.

With the configuration of the engine control unit according to the third aspect of the present invention, it is possible to obtain the same advantageous effects as provided by the first aspect of the present invention.

Preferably, deterioration determination method further comprises detecting an exhaust gas amount parameter indicative of an amount of exhaust gases supplied to the upstream catalyst, and the calculating the upstream OSC parameter includes calculating a first reducing agent amount parameter indicative of an amount of reducing agents supplied to the upstream catalyst and a second reducing agent amount parameter indicative of an amount of reducing agents flowing through the downstream catalyst, using the upstream oxygen concentration parameter, the intermediate oxygen concentration parameter, and the exhaust gas amount parameter, and calculating the upstream OSC parameter, using a first integrated value and a second integrated value obtained by integrating the first reducing agent amount parameter and the second reducing agent amount parameter, at a predetermined computation period, respectively, the calculating the downstream OSC parameter including calculating the second reducing agent amount parameter indicative of an amount of reducing agents supplied to the downstream catalyst and a third reducing agent amount parameter indicative of an amount of reducing agents flowing through the downstream catalyst, using the intermediate oxygen concentration parameter, the downstream oxygen concentration parameter, and the exhaust gas amount parameter, and calculating the downstream OSC parameter using the second integrated value and a third integrated value obtained by integrating the second reducing agent parameter and the third reducing agent parameter, at the predetermined computation period, respectively.

Preferably, the calculating the corrected downstream OSC parameter includes calculating the corrected downstream OSC parameter, such that as the oxygen storage capability of the upstream catalyst indicated by the upstream OSC parameter is smaller, the oxygen storage capability of the downstream catalyst indicated by the corrected downstream OSC parameter becomes larger.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
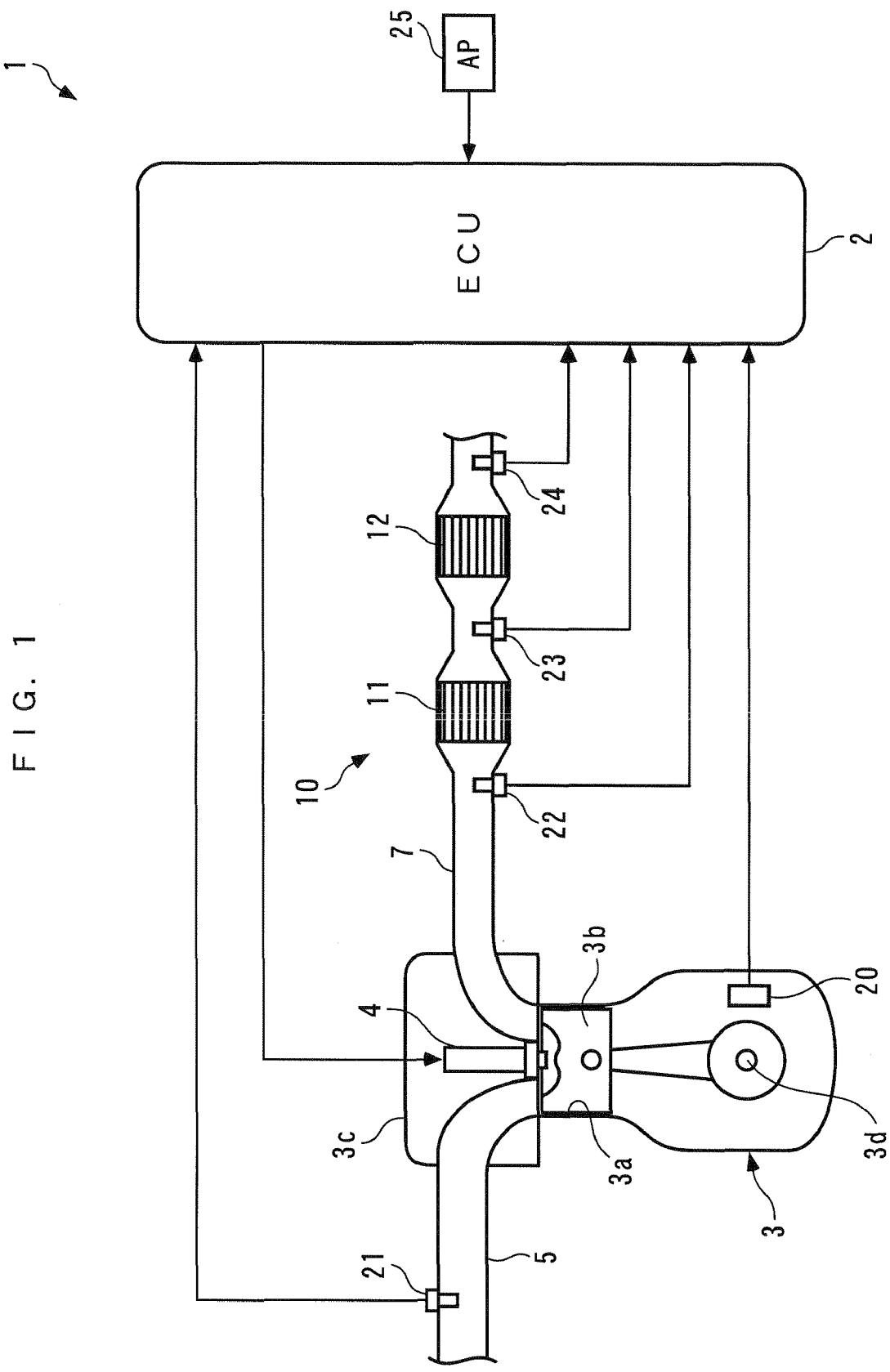
FIG. 1 is a schematic diagram of a deterioration determining device according to an embodiment of the present invention, and an internal combustion engine including an exhaust emission reduction device to which the deterioration determination device is applied.

The invention will now be described in detail with reference to the drawings showing preferred embodiments thereof. FIG. 1 schematically shows a deterioration determining device according to an embodiment of the present invention, and an internal combustion engine including an exhaust emission reduction device to which the deterioration determination device is applied. The deterioration determination device 1 according to the embodiment includes an ECU 2, and the ECU 2 performs various control processes, including an air-fuel ratio control process for an internal combustion engine 3 (hereinafter simply referred to as "the engine") 3, and performs a deterioration determination process for an exhaust emission reduction device 10.

The engine 3 is a diesel engine that is installed on a vehicle, not shown, and includes a plurality of pairs (only one pair is shown) of cylinders 3a and pistons 3b. The engine 3 has a cylinder head 3c having fuel injection valves 4 inserted into the cylinders 3a thereof in a manner facing respective associated combustion chambers.

The fuel injection values 4 are connected to a high-pressure pump and a fuel tank via a common rail, none of which are shown. Fuel pressurized by the high-pressure pump is supplied to each fuel injection valves 4 via the common rail to be injected therefrom into the cylinders 3a. The ECU 2 controls a valve opening time period and valve opening timing of each fuel injection valve 4, thereby executing air-fuel ratio control. By the air-fuel ratio control, the engine 3 is normally operated in a lean combustion state in which a mixture leaner than the stoichiometric air-fuel ratio is burned, and during rich spike control, referred to hereinafter, it is operated in a rich combustion state in which a mixture richer than the stoichiometric air-fuel ratio is burned.

The engine 3 is provided with a crank angle sensor 20. The crank angle sensor 20 is formed by a magnet rotor and an MRE pickup, and delivers a CRK signal and a TDC signal, which are both pulse signals, to the ECU 2 in accordance with rotation of a crankshaft 3d. One pulse of the CRK signal is delivered whenever the crankshaft 3d rotates through a predetermined angle (e.g. 10°). The ECU 2 calculates the rotational speed NE of the engine 3 (hereinafter referred to as "the engine speed NE") based on the CRK signal. Further, the TDC signal indicates that each piston 3b in an associated one of the cylinders 3a is in a predetermined crank angle position slightly before the TDC position at the start of the intake stroke, and one pulse thereof is delivered whenever the crankshaft 3d rotates through a predetermined crank angle.

The engine 3 has an intake passage 5 having an air flow sensor 21 inserted therein, which detects an amount (intake air amount) GAIR of air sucked into the cylinders 3a, to deliver a signal indicative of the sensed intake air amount GAIR to the ECU 2. In the present embodiment, the air flow sensor 21 corresponds to exhaust gas amount parameter-detecting means, and the intake air amount GAIR corresponds to an exhaust gas amount parameter.

On the other hand, the engine 3 has an exhaust passage 7 provided with an exhaust emission reduction device 10. The exhaust emission reduction device 10 includes an upstream catalyst 11 and a downstream catalyst 12 disposed in the exhaust passage 7 in the mentioned order from the upstream side. The upstream catalyst 11 is implemented by a three-way catalyst, and is active when the temperature thereof is not lower than a predetermined activation temperature, for purifying harmful unburned fuel in exhaust gases.

The downstream catalyst 12 is implemented by a NOx catalyst, and has a capability of trapping NOx in exhaust gases flowing therein and an oxygen storage capability of storing oxygen in the exhaust gases, provided that the exhaust gases form an oxidation atmosphere.

Further, the exhaust passage 7 has an upstream LAF sensor 22 disposed upstream of the upstream catalyst 11, an intermediate LAF sensor 23 disposed between the upstream catalyst 11 and the downstream catalyst 12, and a downstream LAF sensor 24 disposed downstream of the downstream catalyst 12.

The LAF sensors 22 to 24, which are comprised of zirconia and platinum electrodes, linearly detect oxygen concentration in exhaust gases flowing through the exhaust passage 7 over a wide range of the air-fuel ratio from a richer region than the stoichiometric air-fuel ratio to a leaner region than the stoichiometric air-fuel ratio, to deliver signals indicative of the respective detected oxygen concentrations to the ECU 2.

Now, it is well known that the oxygen concentration in exhaust gases has a very high correlation with a mass ratio (fuel-air ratio) between reducing agents (unburned fuel) and oxygen, and it is also well known that it is possible to accurately estimate (calculate) one of the oxygen concentration and the mass ratio from the other, based on the correlation. From the above principle, the ECU 2 calculates a first equivalent ratio KACT1 as a value obtained by converting the mass ratio between reducing agents and oxygen in exhaust gases upstream of the upstream catalyst 11 to the fuel-air ratio, based on the detection signal from the upstream LAF sensor 22, and a second equivalent ratio KACT2 as a value obtained by converting the mass ratio between reducing agents and oxygen in exhaust gases between the upstream catalyst 11 and the downstream catalyst 12 to the fuel-air ratio, based on the intermediate LAF sensor 23. Further, the ECU 2 calculates a third equivalent ratio KACT3 as a value obtained by converting the mass ratio between reducing agents and oxygen in exhaust gases downstream of the downstream catalyst 12 to the fuel-air ratio, based on the detection signal from the downstream LAF sensor 24.

In the present embodiment, the upstream LAF sensor 22 and the first equivalent ratio KACT1 correspond to upstream oxygen concentration parameter-detecting means and an upstream oxygen concentration parameter, respectively, the intermediate LAF sensor 23 and the second equivalent ratio KACT2 to intermediate oxygen concentration parameter-detecting means and an intermediate oxygen concentration parameter, respectively, and the downstream LAF sensor 24 and the third equivalent ratio KACT3 to downstream oxygen concentration parameter-detecting means and a downstream oxygen concentration parameter, respectively.

The upstream catalyst 11 has an accelerator opening sensor 25 electrically connected thereto. The accelerator opening sensor 25 detects a stepped-on amount (hereinafter referred to as "accelerator opening") AP of an accelerator pedal, not shown, and delivers a detection signal indicative of the; detected accelerator opening AP to the ECU 2.

The ECU 2 is implemented by a microcomputer comprised of a CPU, a RAM, a ROM, and an I/O interface (none of which is shown). The ECU 2 determines operating conditions of the engine 3 according to the detection signals from the aforementioned sensors 20 to 25 and carries out various control processes. Specifically, as described hereinafter, the ECU 2 carries out an air-fuel ratio control process, a deterioration determination process for determining deterioration of the downstream catalyst 12 of the exhaust emission reduction device 10, and so forth.

It should be noted that in the present embodiment, the ECU 2 corresponds to the upstream oxygen concentration parameter-detecting means, the intermediate oxygen concentration parameter-detecting means, the downstream oxygen concentration parameter-detecting means, control means, upstream OSC parameter-calculating means, downstream OSC parameter-calculating means, corrected downstream OSC parameter-calculating means, deterioration determination means, and exhaust gas amount parameter-detecting means, in the present invention.

Figure 2:
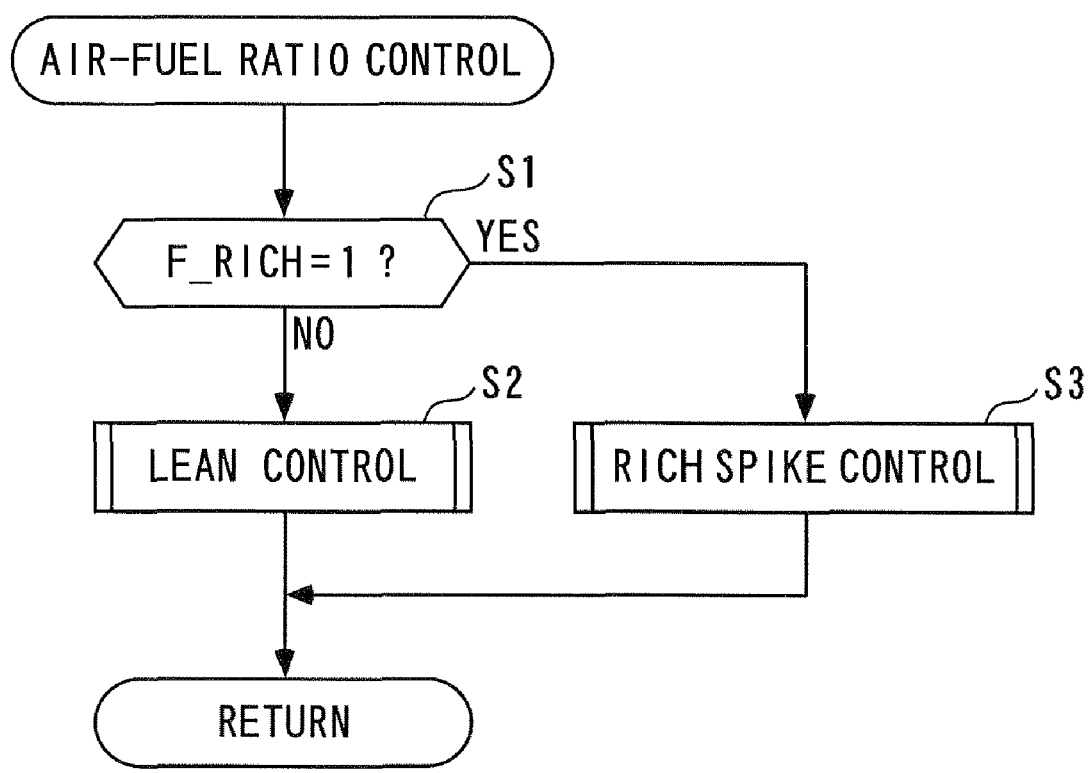
FIG. 2 is a flowchart showing an air-fuel ratio control process.

Hereafter, a description will be given of the air-fuel ratio control process executed by the ECU2, with reference to FIG. 2. This process calculates a fuel injection amount QINJ indicative of the amount of fuel injected by each fuel injection valve 4 and fuel injection timing φINJ, and is executed at a control period synchronized with occurrence of the TDC signal pulse.

In this process, first, in a step 1 (shown as S1 in abbreviated form in FIG. 2; the following steps are also shown in abbreviated form), it is determined whether or not a rich condition flag F_RICH is equal to 1. The rich condition flag F_RICH is set to 1 in a determination process, not shown, when conditions for executing rich spike control are satisfied, and is otherwise set to 0.

If the answer to the question of the step 1 is negative (NO), it is determined that lean control of the air-fuel ratio should be executed, so that the process proceeds to a step 2, wherein a lean control process is executed. In the lean control process, demanded torque PMCMD for lean control is calculated by searching a map, not shown, according to the accelerator pedal opening AP and the engine speed NE, and a map, not shown, is searched according to the demanded torque PMCMD for lean control and the engine speed NE, to thereby calculate the fuel injection amount QINJ for lean control.

Further, a map, not shown, is searched according to the fuel injection amount QINJ for lean control and the engine speed NE, to thereby calculate fuel injection timing φINJ for lean control.

As described above, after executing the lean control process in the step 2, the present process is terminated. This controls the air-fuel ratio of the engine 3 to a value leaner than the stoichiometric air-fuel ratio.

On the other hand, if the answer to the question of the step 1 is affirmative (YES), it is determined that rich spike control should be executed, so that the process proceeds to a step 3, wherein a rich spike control process is executed. In the rich spike control process, demanded torque PMCMD for rich spike control is calculated by searching a map, not shown, according to the accelerator pedal opening AP and the engine speed NE, and a map, not shown, is searched according to the demanded torque PMCMD for rich spike control and the engine speed NE, to thereby calculate the fuel injection amount QINJ for rich spike control. Further, a map, not shown, is searched according to the fuel injection amount QINJ for rich spike control and the engine speed NE, to thereby calculate fuel injection timing φINJ for rich spike control.

After executing the rich spike control process in the step 3, the present process is terminated. This controls the air-fuel ratio of the engine 3 to a value richer than the stoichiometric air-fuel ratio.

Figure 3:
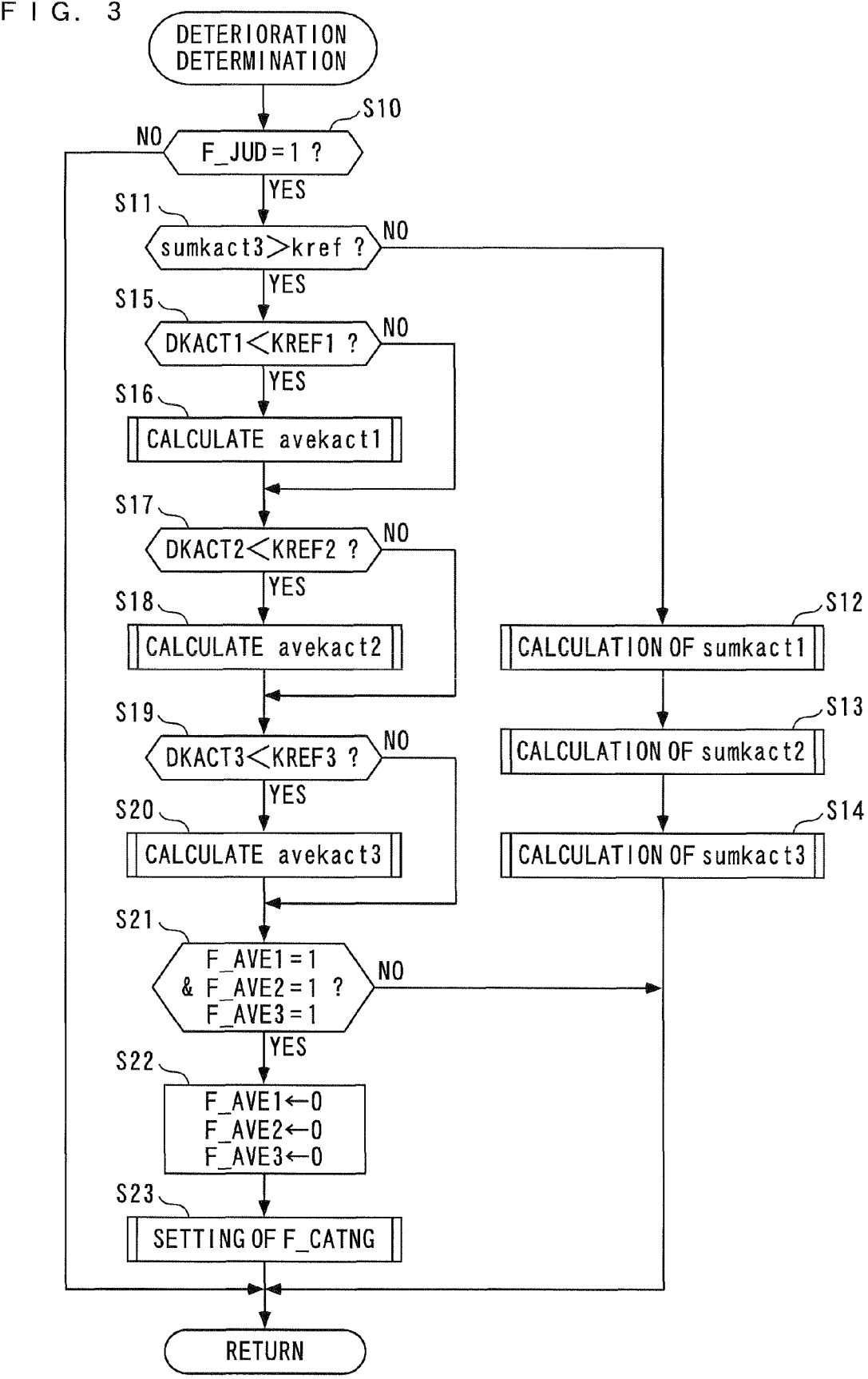
FIG. 3 is a flowchart showing a deterioration determination process executed for a downstream catalyst.

Next, a description will be given of the deterioration determination process executed by the ECU2, with reference to FIG. 3. This process is, as described hereafter, for determining deterioration of the downstream catalyst 12, and is executed at a predetermined control period ΔT (e.g. 10 msec). In the present embodiment, the predetermined control period ΔT corresponds to a predetermined computation period.

First, in a step 10, it is determined whether or not a judgment condition satisfaction flag F_JUD is equal to 1. The judgment condition satisfaction flag F_JUD is set to 1 in a determination process, not shown, when the conditions for determining deterioration of the downstream catalyst 12, including a condition of the rich condition flag F_RICH=1, are satisfied, and is otherwise set to 0.

If the answer to the question of the step 10 is negative (NO), it is determined that the deterioration determination for the downstream catalyst 12 should not be executed, the present process is immediately terminated.

Figure 4:
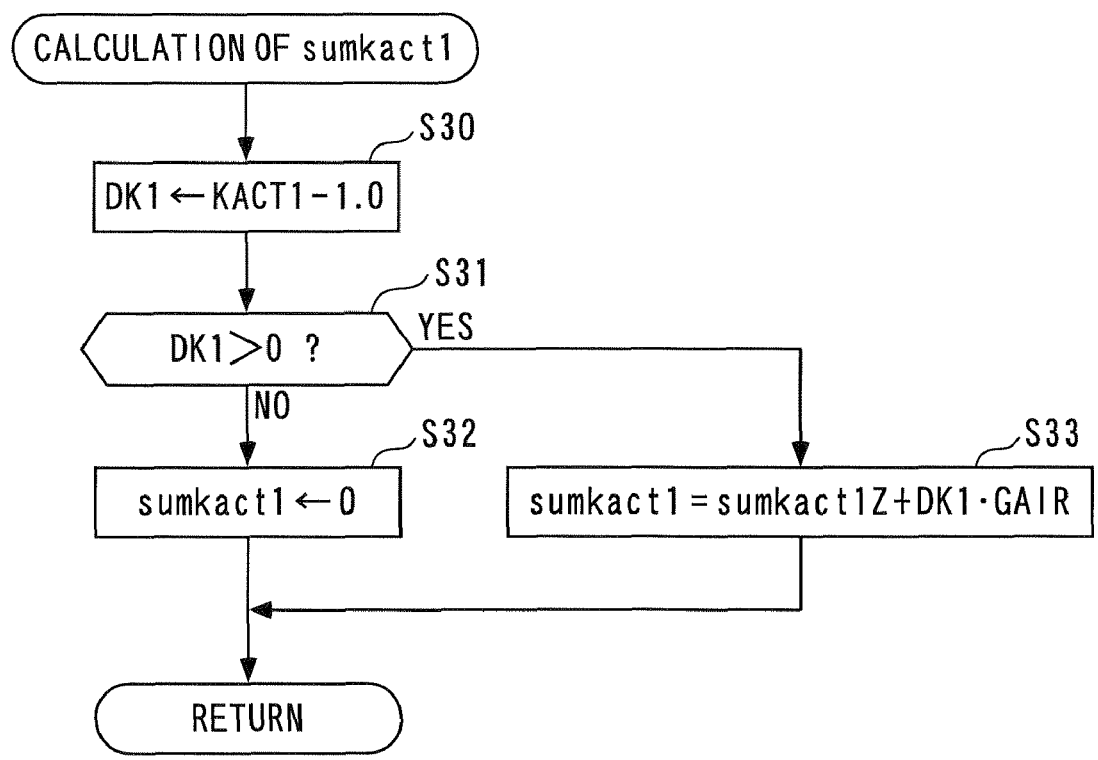
FIG. 4 is a flowchart showing a process for calculating a first reducing agent amount integrated value.

On the other hand, if the answer to the question of the step 10 is affirmative (YES), which means that the judgment conditions for determining the deterioration of the downstream catalyst 12 are satisfied, the process proceeds to a step 11, wherein it is determined whether or not a third reducing agent amount integrated value sumkact3 is larger than a predetermined value kref. If the answer to the question is negative (NO), the process proceeds to a step 12, wherein a first reducing agent amount integrated value sumkact1 is calculated. A process for calculating the first reducing agent amount integrated value sumkact1 is specifically executed as shown in FIG. 4.

In this process, first, in a step 30, the difference between the first equivalent ratio KACT1 and a value of 1.0 (=KACT1−1.0) is set as a first difference DK1. Next, the process proceeds to a step 31, wherein it is determined whether or not the first difference KD1 is larger than 0.

If the answer to this question is negative (NO), i.e. if DK1≦0 holds, the process proceeds to a step 32, wherein the first reducing agent amount integrated value sumkact1 is rest to 0, followed by terminating the present program.

On the other hand, if the answer to the question of the step 31 is affirmative (YES), i.e. if DK1>0 holds, it is determined that the first reducing agent amount integrated value sumkact1 should be calculated, and the process proceeds to a step 33, wherein the first reducing agent amount integrated value sumkact1 is calculated by the following equation (1):

$$sumkact1 = sumkact1Z + DK1 \cdot GAIR \quad (1)$$

In this equation, sumkact1Z represents the immediately preceding value of the first reducing agent amount integrated value sumkact1. Then, the present process is terminated.

As described above, the first reducing agent amount integrated value sumkact1 is calculated by integrating the product DK1·GAIR of the first difference DK1 and the intake air amount GAIR, when DK1>0 holds, i.e. KACT1>1.0 holds, and hence the first reducing agent amount integrated value sumkact1 is calculated as a value representing a total amount of reducing agents flowing into the upstream catalyst 11 from a time point at which the exhaust gases flowing into the upstream catalyst 11 is changed into the reduction atmosphere. It should be noted that in the present embodiment, the product DK1·GAIR corresponds to a first reducing agent amount parameter, and the first reducing agent amount sumkact1 corresponds to a first integrated value.

Figure 5:
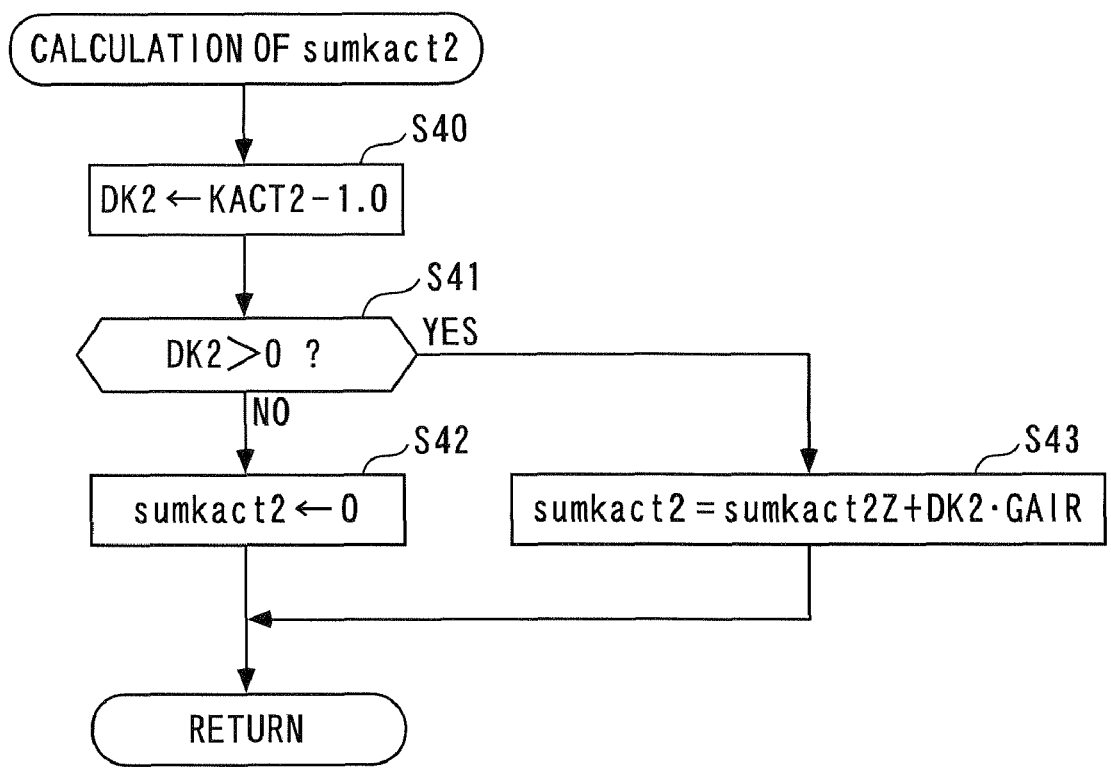
FIG. 5 is a flowchart showing a process for calculating a second reducing agent amount integrated value.

Referring again to FIG. 3, after calculating the first reducing agent amount integrated value sumkact1 in the step 12, as described above, and then the process proceeds to a step 13, wherein a second reducing agent amount integrated value sumkact2 is calculated. A process for calculating the second reducing agent amount integrated value sumkact2 is specifically executed as shown in FIG. 5.

In this process, first, in a step 40, the difference between the second equivalent ratio KACT2 and a value of 1.0 (=KACT2−1.0) is set as a second difference DK2. Next, the process proceeds to a step 41, wherein it is determined whether or not the second difference KD2 is larger than 0.

If the answer to this question is negative (NO), i.e. if DK2≦0 holds, the process proceeds to a step 42, wherein the second reducing agent amount integrated value sumkact2 is rest to 0, followed by terminating the present program.

On the other hand, if the answer to the question of the step 41 is affirmative (YES), i.e. if DK2>0 holds, it is determined that the second reducing agent amount integrated value sumkact2 should be calculated, and the process proceeds to a step 43, wherein the second reducing agent amount integrated value sumkact2 is calculated by the following equation (2):

$$sumkact2 = sumkact2Z + DK2 \cdot GAIR \quad (2)$$

In this equation, sumkact2Z represents the immediately preceding value of the second reducing agent amount integrated value sumkact2. Then, the present process is terminated.

As described above, the second reducing agent amount integrated value sumkact2 is calculated by integrating the product DK2·GAIR of the second difference DK2 and the intake air amount GAIR, when DK2>0 holds, i.e. KACT2>1.0 holds, and hence the second reducing agent amount integrated value sumkact2 is calculated as a value representing a total amount of reducing agents flowing into the downstream catalyst 12 from a time point at which the exhaust gases flowing into the downstream catalyst 12 is changed into the reduction atmosphere. It should be noted that in the present embodiment, the product DK2·GAIR corresponds to a second reducing agent amount parameter, and the second reducing agent amount sumkact2 corresponds to a second integrated value.

Figure 6:
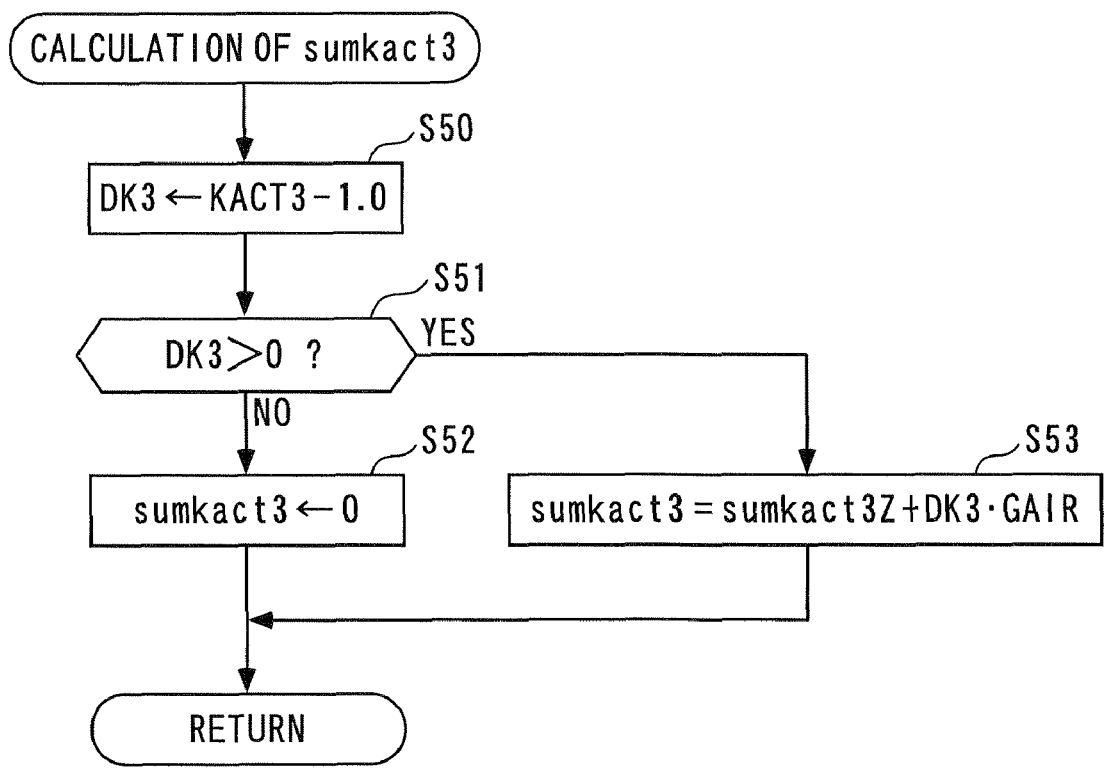
FIG. 6 is a flowchart showing a process for calculating a third reducing agent amount integrated value.

Referring again to FIG. 3, after calculating the second reducing agent amount integrated value sumkact2 in the step 13, as described above, and then the process proceeds to a step 14, wherein a third reducing agent amount integrated value sumkact3 is calculated. A process for calculating the third reducing agent amount integrated value sumkact3 is specifically executed as shown in FIG. 6.

In this process, first, in a step 50, the difference between the third equivalent ratio KACT3 and a value of 1.0 (=KACT3−1.0) is set as a third difference DK3. Next, the process proceeds to a step 51, wherein it is determined whether or not the third difference KD3 is larger than 0.

If the answer to this question is negative (NO), i.e. if DK3≦0 holds, the process proceeds to a step 52, wherein the third reducing agent amount integrated value sumkact3 is rest to 0, followed by terminating the present program.

On the other hand, if the answer to the question of the step 51 is affirmative (YES), i.e. if DK3>0 holds, it is determined that the third reducing agent amount integrated value sumkact3 should be calculated, and the process proceeds to a step 53, wherein the third reducing agent amount integrated value sumkact3 is calculated by the following equation (3):

$$sumkact3 = sumkact3Z + DK3 \cdot GAIR \quad (3)$$

In this equation, sumkact3Z represents the immediately preceding value of the third reducing agent amount integrated value sumkact3. Then, the present process is terminated.

As described above, the third reducing agent amount integrated value sumkact3 is calculated by integrating the product DK3·GAIR of the third difference DK3 and the intake air amount GAIR, when DK3>0 holds, i.e. KACT3>1.0 holds, and hence the third reducing agent amount integrated value sumkact3 is calculated as a value representing a total amount of reducing agents flowing through the downstream catalyst 12 from a time point at which the exhaust gases flowing through the downstream catalyst 12 is changed into the reduction atmosphere. It should be noted that in the present embodiment, the product DK3 GAIR corresponds to a third reducing agent amount parameter, and the third reducing agent amount sumkact3 corresponds to a third integrated value.

Referring back to FIG. 3, after calculating the third reducing agent amount integrated value sumkact3 in the step 14 as described above, the present process is terminated.

On the other hand, if the answer to the question of the step 11 is affirmative (YES), i.e. the third reducing agent amount integrated value sumkact3>the predetermined value kref holds, it is judged that oxygen stored in the downstream catalyst 12 is completely consumed by oxidation reaction with exhaust gases forming the reduction atmosphere which flow through the downstream catalyst 12, so that the process proceeds to a step 15, wherein it is determined whether or not a first equivalent ratio change amount DKACT1 is smaller than a predetermined value KREF1. The first equivalent ratio change amount DKACT1 is calculated as the absolute value of the difference between the present value and the immediately preceding value of the first equivalent ratio (=|KACT1−KACT1Z|).

If the answer to this question of the step 15 is negative (NO), i.e. DKACT1≧KREF1 holds, it is judged that the first equivalent ratio KACT1 is in a transient state, so that the process proceeds to a step 17, referred to hereinafter. On the other hand, if the answer to the question of the step 15 is affirmative (YES), i.e. DKACT1<KREF1 holds, it is judged that the first equivalent ratio KACT1 has reached the steady state, so that the process proceeds to a step 16 wherein an average value avekact1 of the first equivalent ratio KACT1

(hereinafter referred to as "the first equivalent ratio average value") is calculated. The first equivalent ratio average value avekact1 is calculated in the following manner:

The first equivalent ratio KACT1 obtained after satisfaction of DKACT1<KREF1 is sampled in each control timing, and when the number of times of the sampling of the first equivalent ratio KACT1 reaches a predetermined value n (e.g. 100), the n sampled values of the first equivalent ratio KACT1 are averaged (arithmetic mean thereof is calculated) to thereby calculate the first equivalent ratio average value avekact1. Further, when the calculation of the first equivalent ratio average value avekact1 is completed, to indicate this fact, a first averaging computation completion flag F_AVE1 is set to 1.

In the step 17 following the step 15 or 16, it is determined whether or not a second equivalent ratio change amount DKACT2 is smaller than a predetermined value KREF2. The second equivalent ratio change amount DKACT2 is calculated as the absolute value of the difference between the present value and the immediately preceding value of the second equivalent ratio (=|KACT2−KACT2Z|).

If the answer to this question is negative (NO), i.e. DKACT2≧KREF2 holds, it is judged that the second equivalent ratio KACT2 is in a transient state, so that the process proceeds to a step 19, referred to hereinafter. On the other hand, if the answer to the question of the step 17 is affirmative (YES), i.e. DKACT2<KREF2 holds, it is judged that the second equivalent ratio KACT2 has reached the steady state, so that the process proceeds to a step 18, wherein an average value avekact2 of the second equivalent ratio KACT2 (hereinafter referred to as "the second equivalent ratio average value") is calculated. The second equivalent ratio average value avekact2 is calculated in the following manner:

The second equivalent ratio KACT2 obtained after satisfaction of DKACT2<KREF2 is sampled in each control timing, and when the number of times of the sampling of the second equivalent ratio KACT2 reaches the aforementioned predetermined value n, the n sampled values of the second equivalent ratio KACT2 are averaged (arithmetic mean thereof is calculated) to thereby calculate the second equivalent ratio average value avekact2. Further, when the calculation of the second equivalent ratio average value avekact2 is completed, to indicate this fact, a second averaging computation completion flag F_AVE2 is set to 1.

In the step 19 following the step 17 or 18, it is determined whether or not a third equivalent ratio change amount DKACT3 is smaller than a predetermined value KREF3. The third equivalent ratio change amount DKACT3 is calculated as the absolute value of the difference between the present value and the immediately preceding value of the third equivalent ratio (=|KACT3−KACT3Z|).

If the answer to this question is negative (NO), i.e. DKACT3≧KREF3 holds, it is judged that the third equivalent ratio KACT3 is in a transient state, so that the process proceeds to a step 21, referred to hereinafter. On the other hand, if the answer to the question of the step 19 is affirmative (YES), i.e. DKACT3<KREF3 holds, it is judged that the third equivalent ratio KACT3 has reached the steady state, so that the process proceeds to a step 20, wherein an average value avekact3 of the third equivalent ratio KACT3 (hereinafter referred to as "the third equivalent ratio average value") is calculated. The third equivalent ratio average value avekact3 is calculated in the following manner:

The third equivalent ratio KACT3 obtained after satisfaction of DKACT3<KREF3 is sampled in each control timing, and when the number of times of the sampling of the third equivalent ratio KACT3 reaches the aforementioned predetermined value n, the n sampled values of the third equivalent ratio KACT3 are averaged (arithmetic mean thereof is calculated) to thereby calculate the third equivalent ratio average value avekact3. Further, when the calculation of the third equivalent ratio average value avekact3 is completed, to indicate this fact, a third averaging computation completion flag F_AVE3 is set to 1.

In the step 21 following the step 19 or 20, it is determined whether or not the first to third averaging computation completion flags F_AVE1, F_AVE2, and F_AVE3 are all equal to 1. If the answer to this question is negative (NO), i.e. if the calculation of at least one of the first to third equivalent ratio average values avekact1, avekact2, and avekact3 has not been completed, the present process is immediately terminated.

On the other hand, if the answer to the question of this determination is affirmative (YES), i.e. if the calculation of all the first to third equivalent ratio average values avekact1, avekact2, and avekact3 has been completed, the process proceeds to a step 22, wherein all the first to third averaging computation completion flags F_AVE1, F_AVE2, and F_AVE3 are all reset to 0.

Figure 7:
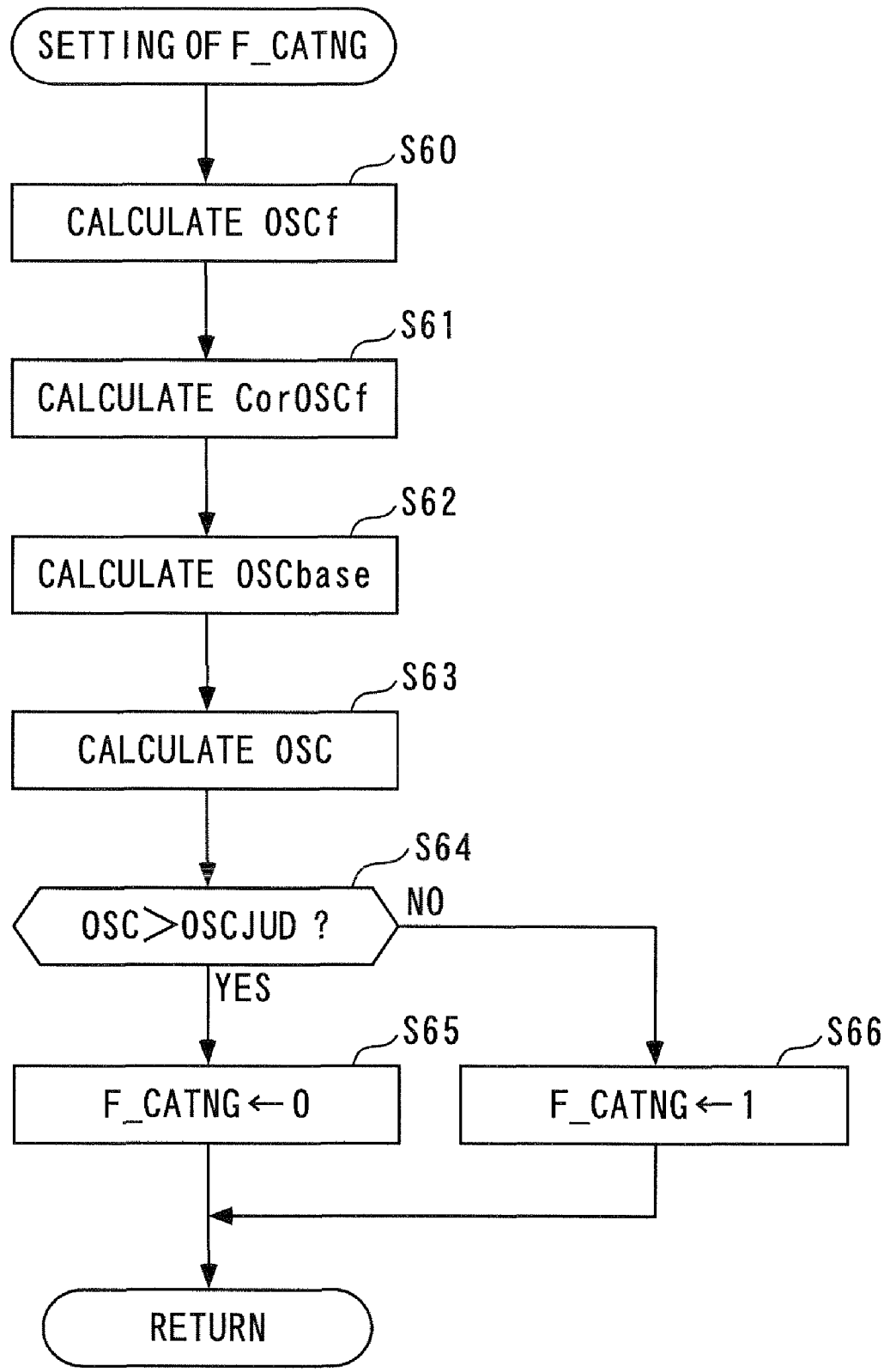
FIG. 7 is a flowchart showing a process for setting a catalyst deterioration flag.

Next, the process proceeds to a step 23, wherein a process for setting a catalyst deterioration flag F_CATNG is executed. This setting process is specifically executed as shown in FIG. 7.

First, in a step 60, the upstream oxygen storage capability OSCf as an upstream OSC parameter is calculated by the following equation (4):

$$OSCf = \frac{sumkact1}{avekact1} - \frac{sumkact2}{avekact2} \quad (4)$$

The upstream oxygen storage capability OSCf represents an oxygen storage capacity of the upstream catalyst 11, and the equation (4) is used for the calculation for the following reason: By changing the equation (4), there is obtained the following equation (5):

$$OSCf = \frac{1}{avekact1}\left(sumkact1 - \frac{avekact1}{avekact2} \cdot sumkact2\right) \quad (5)$$

As is clear from the equation (5), the second term inside the parentheses of the right side thereof is a product of a ratio between the two equivalent ratio average values avekact1/avekacat2 multiplied by the second reducing agent amount integrated value sumkact2, and hence it corresponds to a value obtained by subjecting the second reducing agent amount integrated value sumkact2 to gain correction such that the output value from the upstream LAF sensor 22 and the output value from the intermediate LAF sensor 23 have the same sensitivity.

Here, as mentioned hereinabove, the first reducing agent amount integrated value sumkact1 represents a total amount of reducing agents flowing through the upstream LAF sensor 22 into the upstream catalyst 11 from the time point at which the exhaust gases flowing into the upstream catalyst 11 are changed into the reduction atmosphere, and the second reducing agent amount integrated value sumkact2 represents a total amount of reducing agents flowing into the downstream catalyst 12 from the time point at which the exhaust gases flowing into the downstream catalyst 12 are changed into the reduction atmosphere. Therefore, the difference between the first reducing agent amount integrated value sumkact1 and the second reducing agent amount integrated value sumkact2 subjected to the gain correction as described above (i.e. the value inside the parentheses of the right side of the equation (5)) represents a total amount of reducing agents oxidized by oxygen stored in the upstream catalyst 11 when the exhaust gases forming the reduction atmosphere flow therethrough. Therefore, in the case of the above-mentioned equation (5), i.e. the equation (4), the upstream oxygen storage capability OSCf is calculated by dividing the difference by the first equivalent ratio average value avekact1, and hence the upstream oxygen storage capability OSCf can be calculated as a value properly representing the oxygen storage capability of the upstream catalyst 11. From the above reason, in the present embodiment, the upstream oxygen storage capability OSCf is calculated by the above-mentioned equation (4).

Figure 8:
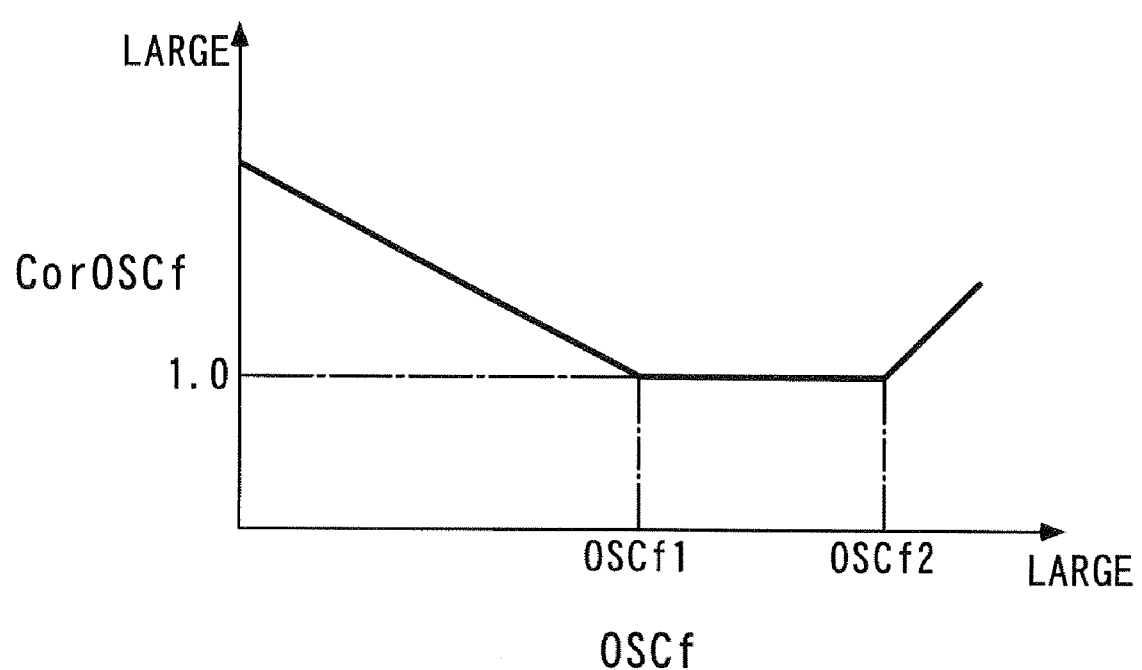
FIG. 8 is a diagram showing an example of a map for use in calculation of an upstream OSC correction coefficient.

In a step 61 following the step 60, a map (one-dimensional map) shown in FIG. 8 is searched according to the upstream oxygen storage capability OSCf, to thereby calculate an upstream correction coefficient CorOSCF. In FIG. 8, OSCf1 and OSCf2 represent predetermined values of the upstream oxygen storage capability OSCf, respectively, set such that OSCf1<OSCf2 holds.

In the case of this map, in a range of OSCf<OSCf1, the upstream OSC correction coefficient CorOSCf is set to a larger value as the upstream oxygen storage capability OSCf is smaller. This is because when the upstream oxygen storage capability OSCf is in the range of OSCf≦OSCf1, as the upstream oxygen storage capability OSCf is smaller, the degree of deterioration of the upstream catalyst 11 becomes larger, and hence the map is configured to cope with this tendency. Further, in a range of OSCf1<OSCf<OSCf2, the upstream OSC correction coefficient CorOSCf is set to a fixed value. This is because when the upstream oxygen storage capability OSCf is in the range of OSCf1<OSCf<OSCf2, the activity of exhaust gases flowing through the upstream catalyst 11 does not change. Further, in a range of OSCf≧OSCf2, the upstream OSC correction coefficient CorOSCf is set to a larger value as the upstream oxygen storage capability OSCf is larger. This is because when the upstream oxygen storage capability OSCf is in the range of OSCf≧OSCf2, as the upstream oxygen storage capability OSCf is larger, the activity of exhaust gases flowing through the upstream catalyst 11 becomes higher, and hence the map is configured to cope with this tendency.

Then, in a step 62, a basic value OSCbase of the downstream oxygen storage capability is calculated by the following equation (6):

$$OSCbase = \frac{sumkact2}{avekact2} - \frac{sumkact3}{avekact3} \quad (6)$$

The basic value OSCbase of the downstream oxygen storage capability represents an oxygen storage capability of the downstream catalyst 12, and the reason for using the above-mentioned equation (6) is the same as mentioned for using the equation (4).

Next, the process proceeds to a step 63, wherein the downstream oxygen storage capability OSC is calculated by the following equation (7):

$$OSC = OSCbase \cdot CorOSCf \quad (7)$$

As shown in the equation (7), the downstream oxygen storage capability OSC is calculated by multiplying the basic value OSCbase of the downstream oxygen storage capability by the upstream OSC correction coefficient CorOSCf, and hence the downstream oxygen storage capability OSC can be calculated as a value accurately representing an actual oxygen storage capability of the downstream catalyst 12, while eliminating influence of deterioration of the upstream catalyst 11. In the present embodiment, the basic value OSCbase of the downstream oxygen storage capability corresponds to a downstream OSC parameter and the downstream oxygen storage capability OSC corresponds to a corrected downstream OSC parameter.

In a step 64 following the step 63, it is determined whether or not the downstream oxygen storage capability OSC is larger than a predetermined reference value OSCJUD. If the answer to this question is affirmative (YES), i.e. if OSC>OSCJUD holds, it is judged that the downstream catalyst 12 is not deteriorated, so that the process proceeds to a step 65, wherein to indicate this fact, the catalyst deterioration flag F_CATNG is set to 0, followed by terminating the present process.

On the other hand, if the answer to the question of the step 64 is negative (NO), i.e. if OSC≦OSCJUD holds, it is judged that the downstream catalyst 12 is deteriorated, so that the process proceeds to a step 66, wherein to indicate this fact, the catalyst deterioration flag F_CATNG is set to 1, followed by terminating the present process.

Referring again to FIG. 3, after the catalyst deterioration flag F_CATNG is set in the step 23 as described above, the present process is terminated.

As described above, according to the deterioration determination device 1 according to the present embodiment, by the aforementioned equation (4), the upstream oxygen storage capability OSCf is calculated based on the first and second reducing agent amount integrated values sumkact1 and sumkact2, and the first and second equivalent ratio average values avekact1 and avekcact2. Here, the first reducing agent amount integrated value sumkact1 is calculated by integrating the product DK1·GAIR of the first difference DK1 and the intake air amount GAIR after the time point of satisfaction of the condition of KACT1>1.0, and the second reducing agent amount integrated value sumkact2 is calculated by integrating the product DK2·GAIR of the second difference DK2 and the intake air amount GAIR after the time point of satisfaction of the condition of KACT2>1.0. Therefore, even when detection results of the upstream LAF sensor 22 and the intermediate LAF sensor 23 (first and second equivalent ratios KACT1 and KACT2) suffer from temporary detection errors due to changes in the air-fuel ratio of exhaust gases and/or the flow rate of exhaust gases which are caused by a change in the operating conditions of the engine 3, it is possible to calculate the upstream oxygen storage capability OSCf as a value accurately representing the degree of deterioration of the upstream catalyst 11 while eliminating influence of the temporary errors, differently from the method disclosed in Japanese Laid-Open Patent Publication (Kokai) No. 2000-328929 in which the output values from the two sensors are directly used for calculation of the first timer count value tmMON1.

Further, by the above-mentioned equation (6), the basic value OSCbase of the downstream oxygen storage capability is calculated based on the second and third reducing agent amount integrated values sumkact2 and sumkact3 and the second third equivalent ratio average value avekact2 and avekact3. Here, the second reducing agent amount integrated value sumkact2 is calculated by integrating the product DK2·GAIR of the second difference DK2 and the intake air amount GAIR after the time point of satisfaction of the condition of KACT2>1.0, and the third reducing agent amount integrated value sumkact3 is calculated by integrating the product DK3·GAIR of the third difference DK3 and the intake air amount GAIR after the time point of satisfaction of the condition of KACT3>1.0. Therefore, even when detection results of the intermediate LAF sensor 23 and the downstream LAF sensor 24 (second and third equivalent ratios KACT2 and KACT3) suffer from temporary detection errors due to changes in the air-fuel ratio of exhaust gases and/or the flow rate of exhaust gases which are caused by a change in the operating conditions of the engine 3, it is possible to calculate the basic value OSCbase of the downstream oxygen storage capability OSC as a value accurately representing the degree of deterioration of the downstream catalyst 12 while eliminating influence of the temporary errors, differently from the method disclosed in Japanese Laid-Open Patent Publication (Kokai) No. 2000-328929 in which the output values from the two sensors are directly used for calculation of the second timer count value tmMON2.

Figure 9A:
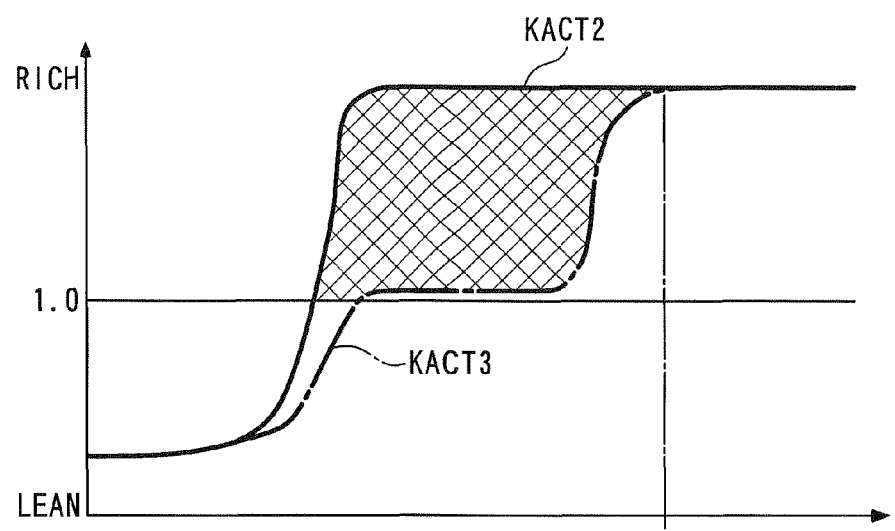
FIG. 9A is a diagram showing changes in a second equivalent ratio and a third equivalent ratio as time elapses after a start of rich spike control, in a state in which the downstream catalyst is active and is not sulfur-poisoned.
Figure 9B:
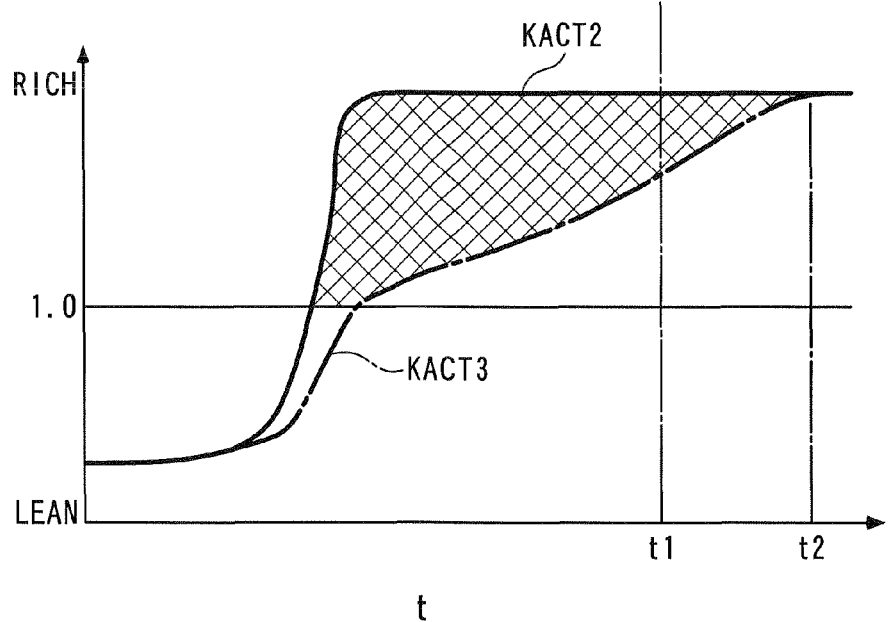
FIG. 9B is a diagram showing changes in the second equivalent ratio and the third equivalent ratio as time elapses after the start of rich spike control, in a state in which the downstream catalyst is active and is sulfur-poisoned

Further, the upstream oxygen storage capability OSCf is calculated using the two integrated values sumkact1 and sumkact2, and the basic value OSCbase of the downstream oxygen storage capability is calculated using the two integrated values sumkact2 and sumkact3. Therefore, it is possible to perform the deterioration determination while suppressing the influence of the activities and poisoned states of the upstream catalyst 11 and the downstream catalyst 12. The reason for this will be explained with reference to FIGS. 9A and 9B. FIGS. 9A and 9B both show changes in the second equivalent ratio KACT2 and the third equivalent ratio as time elapses after the start of rich spike control. FIG. 9A particularly shows a state in which the downstream catalyst 12 is active and is not sulfur-poisoned, while FIG. 9B particularly shows a state in which the downstream catalyst 12 is active and sulfur-poisoned. Further, in respective FIGS. 9A and 9B, t1 and t2 indicate respective timings in which the third equivalent ratio KACT3 has changed from a transient state to a steady state.

Now, since the basic value OSCbase of the downstream oxygen storage capability is calculated by the equation (6), assuming that that intake air GAIR is fixed, the basic value OSCbase of the downstream oxygen storage capability corresponds to a value obtained by multiplying a shaded area shown in each of FIGS. 9A and 9B, by the intake air amount GAIR. As is clear from comparison between FIGS. 9A and 9B, although the slope of the third equivalent ratio KACT3 in FIG. 9B is gentler than that in FIG. 9A due to the fact that the downstream catalyst 12 is in the sulfur-poisoned state, the difference between shaded areas in FIGS. 9A and 9B is small. In other words, irrespective of whether the downstream catalyst 12 is sulfur-poisoned, the basic value OSCbase of the oxygen storage capability can be calculated as substantially the same value, whereby it is known that the deterioration determination can be executed while suppressing influence of the sulfur-poisoned state. Further, the active and inactive states of the downstream catalyst 12 also produce the similar events as illustrated in FIGS. 9A and 9B, whereby irrespective of whether or not the downstream catalyst 12 is active, the basic value OSCbase of the downstream oxygen storage capability can be calculated substantially as the same value. For the reason stated above, the deterioration determination device 1 according to the present embodiment is capable of performing the deterioration determination while suppressing the influence of the activities and poisoned states of the upstream catalyst 11 and the downstream catalyst 12, whereby it is possible to improve the accuracy of the deterioration determination, compared with the conventional deterioration determination device which directly uses the output values from the three sensors, Further, the upstream OSC correction coefficient CorOSCf is calculated according to the upstream oxygen storage capability OSCf, and the downstream oxygen storage capability OSC is calculated by multiplying the basic value OSCbase of the downstream oxygen storage capability by the upstream OSC correction coefficient CorOSCf. Therefore, the downstream oxygen storage capability OSC can be calculated as a value accurately representing an actual oxygen storage capability of the downstream catalyst 12 while eliminating the influence of deterioration of the upstream catalyst 11. Therefore, since the deterioration determination for the downstream catalyst 12 is executed based on the downstream oxygen storage capability OSC thus calculated, the accuracy of the deterioration determination can be improved compared with the method disclosed in Japanese Laid-Open Patent Publication (Kokai) No. 2000-328929.

In addition to this, as mentioned hereinabove, in the range of $OSCf \leqq OSCf1$, the upstream OSC correction coefficient CorOSCf is set to a larger value as the upstream oxygen storage capability OSCF is smaller, and hence the downstream oxygen storage capability OSC is calculated such that it becomes larger as the upstream oxygen storage capability is smaller. This makes it possible to prevent an erroneous determination that the downstream catalyst 12, which is not deteriorated, is determined to be deteriorated due to deterioration of the upstream catalyst 11.

Although the present embodiment is an example in which the upstream catalyst is implemented by a three-way catalyst, this is not limitative, but an suitable catalyst may be used insofar as it is capable of purifying exhaust gases, and has an oxygen storage capability. For example, a NOx purifying catalyst may be used as the upstream catalyst. Further, although the present embodiment is an example in which the downstream catalyst is implemented by a NOx purifying catalyst, this is not limitative, but any suitable catalyst may be used insofar as it is capable of purifying exhaust gases, and has an oxygen storage capability. For example, a three-way catalyst may be used as the downstream catalyst.

Further, in the present embodiment, as the upstream oxygen concentration parameter-detecting means, the upstream LAF sensor 22 is employed, this is not limitative, but any suitable sensor may be used insofar as it is capable of detecting an oxygen concentration parameter indicative of an oxygen concentration in exhaust gases upstream of the upstream catalyst. For example, as the upstream oxygen concentration parameter-detecting means, there may be employed a NOx concentration sensor that linearly detects not only NOx concentration in exhaust gases but also oxygen concentration, or an oxygen concentration sensor that delivers a detection value which shows a predetermined slope when the air-fuel ratio of exhaust gases is changed from the stoichiometric air-fuel ratio into a richer value.

Further, the present embodiment is an example in which as the intermediate oxygen concentration parameter-detecting means, the intermediate LAF sensor 23 is employed, this is not limitative, but any suitable sensor may be employed insofar as it is capable of detecting an oxygen concentration parameter indicative of an oxygen concentration in exhaust gases between the upstream catalyst and the downstream catalyst. For example, as the intermediate oxygen concentration parameter-detecting means, there may be employed the above-mentioned NOx concentration sensor that linearly detects not only NOx concentration in exhaust gases but also oxygen concentration, or the above-mentioned oxygen concentration sensor that delivers a detection value which shows a predetermined slope when the air-fuel ratio of exhaust gases is changed from the stoichiometric air-fuel ratio into a richer value.

Further, the present embodiment is an example in which as the downstream oxygen concentration parameter-detecting means, the downstream LAF sensor 24 is employed, this is not limitative, but any suitable sensor may be employed insofar as it is capable of detecting an oxygen concentration parameter indicative of an oxygen concentration in exhaust gases downstream of the downstream catalyst. For example, as the downstream oxygen concentration parameter-detecting means, there may be employed the above-mentioned NOx concentration sensor that linearly detects not only NOx concentration in exhaust gases but also oxygen concentration, or the above-mentioned oxygen concentration sensor that delivers a detection value which shows a predetermined slope when the air-fuel ratio of exhaust gases is changed from the stoichiometric air-fuel ratio into a richer value.

Further, the embodiment is an example in which as the upstream OSC parameter, the upstream oxygen storage capability OSCf is employed, this is not limitative, but any suitable parameter may be employed insofar as it represents the oxygen storage capability of the upstream catalyst.

Further, the embodiment is an example in which as the downstream OSC parameter, the basic value OSCbase of the downstream oxygen storage capability is employed, this is not limitative, but any suitable parameter may be employed insofar as it represents the oxygen storage capability of the downstream catalyst.

Furthermore, the embodiment is an example in which the downstream oxygen storage capability OSC as the corrected downstream OSC parameter is calculated by multiplying the basic value OSCbase of the downstream oxygen storage capability by the upstream OSC correction coefficient CorOSCf, this is not limitative, but the corrected downstream OSC parameter may be calculated by any suitable method, insofar as it corrects the downstream OSC parameter according to the upstream OSC parameter. For example, the corrected downstream OSC parameter may be configured to be calculated by searching a map according to the upstream OSC parameter and the downstream OSC parameter.

It is further understood by those skilled in the art that the foregoing are preferred embodiments of the invention, and that various changes and modifications may be made without departing from the spirit and scope thereof.

What is claimed is:

1. A deterioration determination device for an exhaust emission reduction device including an upstream catalyst that purifies exhaust gases flowing through an exhaust passage of an internal combustion engine and has an oxygen storage capability, and a downstream catalyst that purifies exhaust gases in the exhaust passage downstream of the upstream catalyst and has an oxygen storage capability, the deterioration determination device determining deterioration of the downstream catalyst, comprising:

upstream oxygen concentration parameter-detecting means for detecting an oxygen concentration parameter indicative of an oxygen concentration in exhaust gases upstream of the upstream catalyst, as an upstream oxygen concentration parameter;

intermediate oxygen concentration parameter-detecting means for detecting an oxygen concentration parameter indicative of an oxygen concentration in exhaust gases between the upstream catalyst and the downstream catalyst, as an intermediate oxygen concentration parameter;

downstream oxygen concentration parameter-detecting means for detecting an oxygen concentration parameter indicative of an oxygen concentration in exhaust gases downstream of the downstream catalyst, as a downstream oxygen concentration parameter;

control means for controlling exhaust gases flowing into the upstream catalyst by switching between an oxidation atmosphere and a reduction atmosphere;

upstream OSC parameter-calculating means for calculating an upstream OSC parameter indicative of the oxygen storage capability of the upstream catalyst, using the upstream oxygen concentration parameter and the intermediate oxygen concentration parameter which are detected on the exhaust gases after the exhaust gases are switched by said control means from the oxidation atmosphere to the reduction atmosphere;

downstream OSC parameter-calculating means for calculating a downstream OSC parameter indicative of the oxygen storage capability of the downstream catalyst, using the intermediate oxygen concentration parameter and the downstream oxygen concentration parameter which are detected on the exhaust gases after the exhaust gases are switched by said control means from the oxidation atmosphere to the reduction atmosphere;

corrected downstream OSC parameter-calculating means for calculating a corrected downstream OSC parameter by correcting the calculated downstream OSC parameter according to the calculated upstream OSC parameter; and deterioration determination means for executing deterioration determination of the downstream catalyst, using the calculated corrected downstream OSC parameter.

2. A deterioration determination device as claimed in claim 1, further comprising an exhaust gas amount parameter-detecting means for detecting an exhaust gas amount parameter indicative of an amount of exhaust gases supplied to the upstream catalyst, and wherein said upstream OSC parameter-calculating means calculates a first reducing agent amount parameter indicative of an amount of reducing agents supplied to the upstream catalyst and a second reducing agent amount parameter indicative of an amount of reducing agents flowing through the downstream catalyst, using the upstream oxygen concentration parameter, the intermediate oxygen concentration parameter, and the exhaust gas amount parameter, and calculates the upstream OSC parameter, using a first integrated value and a second integrated value obtained by integrating the first reducing agent amount parameter and the second reducing agent amount parameter, at a predetermined computation period, respectively; and wherein said downstream OSC parameter-calculating means calculates the second reducing agent amount parameter indicative of an amount of reducing agents supplied to the downstream catalyst and a third reducing agent amount parameter indicative of an amount of reducing agents flowing through the downstream catalyst, using the intermediate oxygen concentration parameter, the downstream oxygen concentration parameter, and the exhaust gas amount parameter, and calculates the downstream OSC parameter using the second integrated value and a third integrated value obtained by integrating the second reducing agent parameter and the third reducing agent parameter, at the predetermined computation period, respectively.

3. A deterioration determination device as claimed in claim 1, wherein said corrected downstream OSC parameter-calculating means calculates the corrected downstream OSC parameter, such that as the oxygen storage capability of the upstream catalyst indicated by the upstream OSC parameter is smaller, the oxygen storage capability of the downstream catalyst indicated by the corrected downstream OSC parameter becomes larger.

4. A deterioration determination method for an exhaust emission reduction device including an upstream catalyst that purifies exhaust gases flowing through an exhaust passage of an internal combustion engine and has an oxygen storage capability, and a downstream catalyst that purifies exhaust gases in the exhaust passage downstream of the upstream catalyst and has an oxygen storage capability, the deterioration determination method determining deterioration of the downstream catalyst, comprising:

detecting an oxygen concentration parameter indicative of an oxygen concentration in exhaust gases upstream of the upstream catalyst, as an upstream oxygen concentration parameter;

detecting an oxygen concentration parameter indicative of an oxygen concentration in exhaust gases between the upstream catalyst and the downstream catalyst, as an intermediate oxygen concentration parameter;

detecting an oxygen concentration parameter indicative of an oxygen concentration in exhaust gases downstream of the downstream catalyst, as a downstream oxygen concentration parameter;

controlling exhaust gases flowing into the upstream catalyst by switching between an oxidation atmosphere and a reduction atmosphere;

calculating an upstream OSC parameter indicative of the oxygen storage capability of the upstream catalyst, using the upstream oxygen concentration parameter and the intermediate oxygen concentration parameter which are detected on the exhaust gases after the exhaust gases are switched by said controlling from the oxidation atmosphere to the reduction atmosphere;

calculating a downstream OSC parameter indicative of the oxygen storage capability of the downstream catalyst, using the intermediate oxygen concentration parameter and the downstream oxygen concentration parameter which are detected on the exhaust gases after the exhaust gases are switched by said controlling from the oxidation atmosphere to the reduction atmosphere;

calculating a corrected downstream OSC parameter by correcting the calculated downstream OSC parameter according to the calculated upstream OSC parameter; and executing deterioration determination of the downstream catalyst, using the calculated corrected downstream OSC parameter.

5. A deterioration determination method as claimed in claim 4, further comprising detecting an exhaust gas amount parameter indicative of an amount of exhaust gases supplied to the upstream catalyst, and wherein said calculating the upstream OSC parameter includes calculating a first reducing agent amount parameter indicative of an amount of reducing agents supplied to the upstream catalyst and a second reducing agent amount parameter indicative of an amount of reducing agents flowing through the downstream catalyst, using the upstream oxygen concentration parameter, the intermediate oxygen concentration parameter, and the exhaust gas amount parameter, and calculating the upstream OSC parameter, using a first integrated value and a second integrated value obtained by integrating the first reducing agent amount parameter and the second reducing agent amount parameter, at a predetermined computation period, respectively; and wherein said calculating the downstream OSC parameter includes calculating the second reducing agent amount parameter indicative of an amount of reducing agents supplied to the downstream catalyst and a third reducing agent amount parameter indicative of an amount of reducing agents flowing through the downstream catalyst, using the intermediate oxygen concentration parameter, the downstream oxygen concentration parameter, and the exhaust gas amount parameter, and calculating the downstream OSC parameter using the second integrated value and a third integrated value obtained by integrating the second reducing agent parameter and the third reducing agent parameter, at the predetermined computation period, respectively.

6. A deterioration determination method as claimed in claim 4, wherein said calculating the corrected downstream OSC parameter includes calculating the corrected downstream OSC parameter, such that as the oxygen storage capability of the upstream catalyst indicated by the upstream OSC parameter is smaller, the oxygen storage capability of the downstream catalyst indicated by the corrected downstream OSC parameter becomes larger.

7. An engine control unit including a control program for causing a computer to execute a deterioration determination method for an exhaust emission reduction device including an upstream catalyst that purifies exhaust gases flowing through an exhaust passage of an internal combustion engine and has an oxygen storage capability, and a downstream catalyst that purifies exhaust gases in the exhaust passage downstream of the upstream catalyst and has an oxygen storage capability, the deterioration determination method determining deterioration of the downstream catalyst, wherein the deterioration determination method comprises:

detecting an oxygen concentration parameter indicative of an oxygen concentration in exhaust gases upstream of the upstream catalyst, as an upstream oxygen concentration parameter;

detecting an oxygen concentration parameter indicative of an oxygen concentration in exhaust gases between the upstream catalyst and the downstream catalyst, as an intermediate oxygen concentration parameter;

detecting an oxygen concentration parameter indicative of an oxygen concentration in exhaust gases downstream of the downstream catalyst, as a downstream oxygen concentration parameter;

controlling exhaust gases flowing into the upstream catalyst by switching between an oxidation atmosphere and a reduction atmosphere;

calculating an upstream OSC parameter indicative of the oxygen storage capability of the upstream catalyst, using the upstream oxygen concentration parameter and the intermediate oxygen concentration parameter which are detected on the exhaust gases after the exhaust gases are switched by said controlling from the oxidation atmosphere to the reduction atmosphere;

calculating a downstream OSC parameter indicative of the oxygen storage capability of the downstream catalyst, using the intermediate oxygen concentration parameter and the downstream oxygen concentration parameter which are detected on the exhaust gases after the exhaust gases are switched by said controlling from the oxidation atmosphere to the reduction atmosphere;

calculating a corrected downstream OSC parameter by correcting the calculated downstream OSC parameter according to the calculated upstream OSC parameter; and executing deterioration determination of the downstream catalyst, using the calculated corrected downstream OSC parameter.

8. An engine control unit as claimed in claim 7, wherein deterioration determination method further comprises detecting an exhaust gas amount parameter indicative of an amount of exhaust gases supplied to the upstream catalyst, and wherein said calculating the upstream OSC parameter includes calculating a first reducing agent amount parameter indicative of an amount of reducing agents supplied to the upstream catalyst and a second reducing agent amount parameter indicative of an amount of reducing agents flowing through the downstream catalyst, using the upstream oxygen concentration parameter, the intermediate oxygen concentration parameter, and the exhaust gas amount parameter, and calculating the upstream OSC parameter, using a first integrated value and a second integrated value obtained by integrating the first reducing agent amount parameter and the second reducing agent amount parameter, at a predetermined computation period, respectively; and wherein said calculating the downstream OSC parameter includes calculating the second reducing agent amount parameter indicative of an amount of reducing agents supplied to the downstream catalyst and a third reducing agent amount parameter indicative of an amount of reducing agents flowing through the downstream catalyst, using the intermediate oxygen concentration parameter, the downstream oxygen concentration parameter, and the exhaust gas amount parameter, and calculating the downstream OSC parameter using the second integrated value and a third integrated value obtained by integrating the second reducing agent parameter and the third reducing agent parameter, at the predetermined computation period, respectively.

9. An engine control unit as claimed in claim 7, wherein said calculating the corrected downstream OSC parameter includes calculating the corrected downstream OSC parameter, such that as the oxygen storage capability of the upstream catalyst indicated by the upstream OSC parameter is smaller, the oxygen storage capability of the downstream catalyst indicated by the corrected downstream OSC parameter becomes larger.

* * * * *